Dec. 28, 1937.  F. A. OLMSTEAD  2,103,550
TIRE LUG
Filed July 1, 1935  2 Sheets-Sheet 1
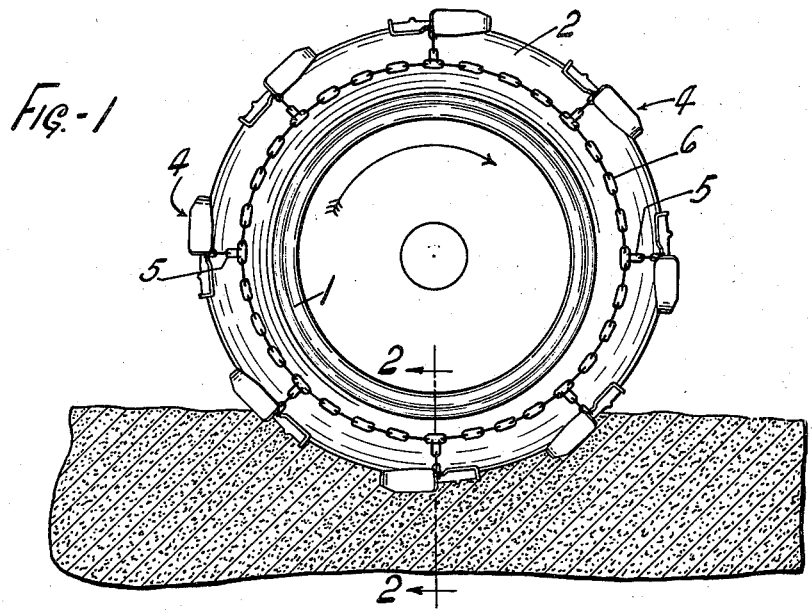
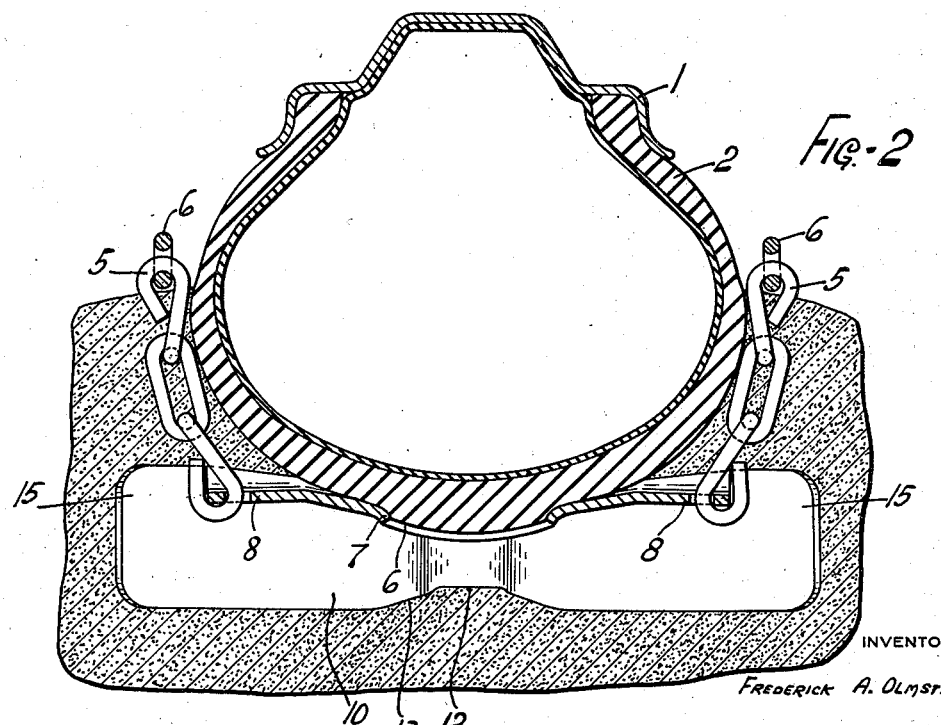
INVENTOR
FREDERICK A. OLMSTEAD
BY
ATTORNEY

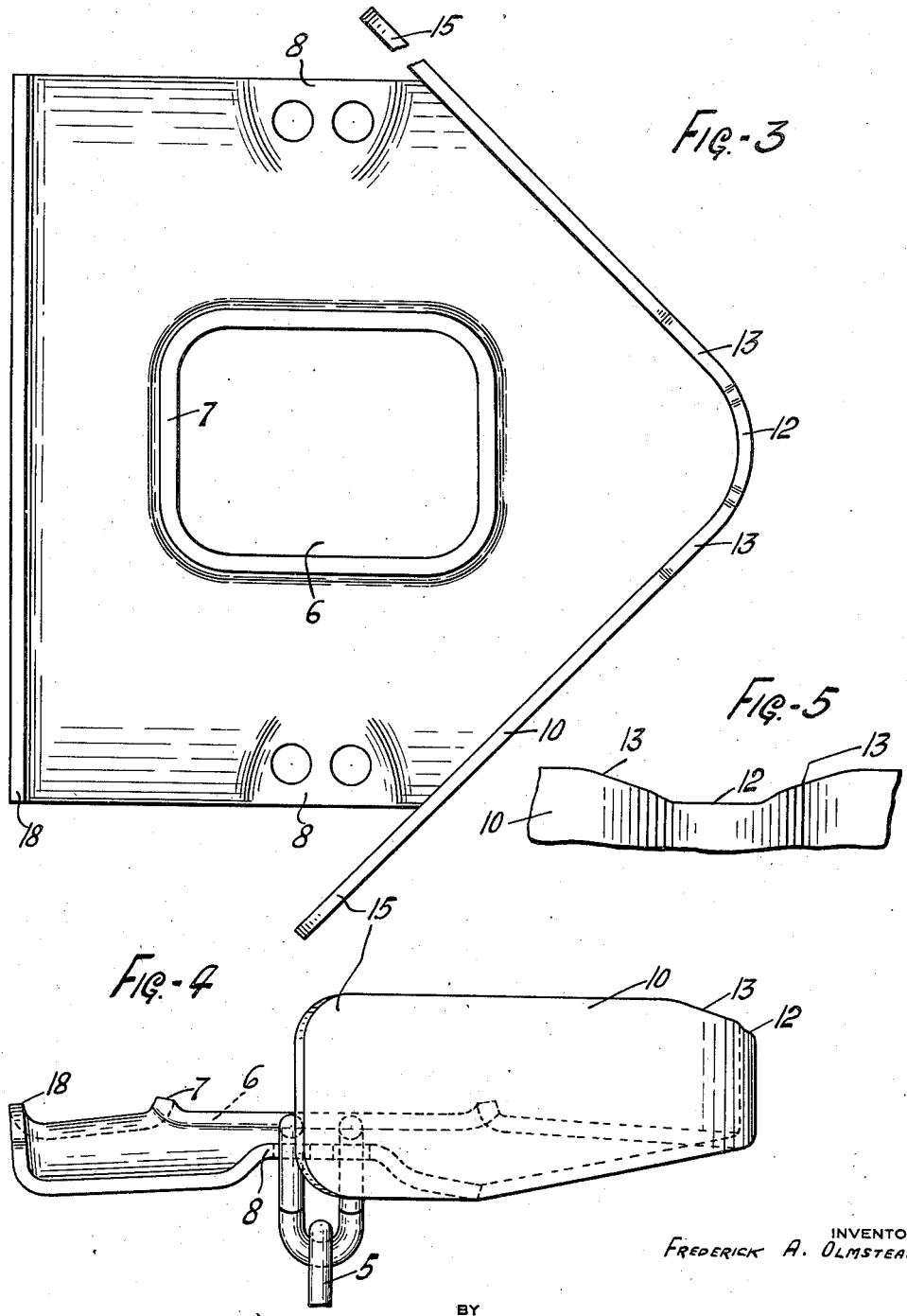

Patented Dec. 28, 1937

2,103,550

UNITED STATES PATENT OFFICE 2,103,550

TIRE LUG

Frederick A. Olmstead, Cleveland Heights, Ohio, assignor to The Chain Products Company, Cleveland, Ohio, a corporation of Ohio Application July 1, 1935, Serial No. 29,275

3 Claims. (Cl. 152—14)

The present invention relates to the construction and design of metal shoes or lugs which are attached to tires used on large tractors or other vehicles. The objects of the invention are to provide a lug or shoe of this type which will most efficiently perform the heavy duty required in the most difficult situations where earlier types of lugs have proven ineffective or inefficient.

The present invention has been brought about by the demand for a new type of lug which will operate satisfactorily over soft or mashy ground, or where clay soils are encountered. It has been particularly brought about by the very severe and unusual conditions which exist in the cane fields of the South where black soil, known as "gumbo", is encountered. This slippery soil has presented problems which are peculiar and with which former designs of tractor lugs have been unable to cope. One difficulty has been the tendency of the sticky soil to cake within an ordinary lug, thus losing traction. In the cane fields, it is customary to strip the cane in the field and to strew the refuse over the ground, which makes it almost impossible to secure traction with old forms of lugs. The present design of lug not only does not cake with mud, but any masses adhering to the lug will be freed therefrom by the action of the tire on the lug. The lug is so constructed that it will cut through the refuse and into the soil, and thus insure traction under the most adverse and trying conditions. The lug is also constructed so that, when the tractor runs in ruts, the lug will bite into the soil on the sides of the rut.

Another object of the invention is to construct a lug in such manner that heavy chains may be attached securely and easily and without the necessity of providing special ring attachments. The lug is also designed to have single chain attachment on each side. It has been found that with double chain attachments on each side of the lug, the tire will tend to slip through the lug, while with the single chain attachment, the lug will adjust itself in closer gripping relation with the tire, and will even tend to tilt or cock slightly, thus affording a firmer grip on the tire, and slipping will be effectively retarded.

It is also desirable to have a construction in which the lug will not present a too sudden or abrupt obstacle to the ground, and for this reason the lug is made so that it will roll more easily than former types of lugs without sacrificing traction. It is also advantageous to have a lug construction which, while effective on the soft or wet and slippery soil, will at the same time not injure the paved surface of the road, and for this purpose the lug is made so that it may be run directly from the field onto the paved road and will not cut the pavement. It is quite a common practise to run from the fields to a refinery or depot, and the ability to make the run without taking off the chains is very advantageous.

The present design of lug is the result of extensive experimentation and design to arrive at a form of lug which will embody all of the desirable features above enumerated. This experimentation has covered numerous trials in the field and under actual conditions, particularly in the cane fields of the South where the soil and other factors have made it extremely difficult to operate except with a lug of the type and design here shown.

The lug is particularly adapted for and used with tires of large cross section which are operated at low pressures, as has become the practise in more recent years. The fact that the tires are larger and the pressures lower than in earlier practises has been utilized in the design and construction of the improved lug to secure certain of the advantages set forth. The combination of the large, low pressure tire with the apertured lug, and the formation of the cleats with extended wings, and the single chain suspension, virtually locks the tire to the ground through the lug, and a much more effective traction effect is secured than with former types of lugs.

While the description and drawings are detailed as to the various features embodied in the new form of lug and give a close and careful description of all of the features, it will be understood that the inventive concept here involved may be incorporated in other forms and modifications, such as fall within the scope of the invention. It will be appreciated, therefore, that changes, modifications and improvements may be incorporated in the lug shown, which is the best known form of the invention, without departing from the new principles involved.

In the drawings in which the preferred form of the invention is shown

Fig. 1 is a side elevation of a wheel and tire with a set of the improved lugs thereon;

Fig. 2 is an enlarged cross section on the line 2—2 of Fig. 1, being intended to illustrate the condition of the tire and lug under load;

Fig. 3 is a plan view of the lug removed from the tire;

Fig. 4 is a side view thereof; and

Fig. 5 is a view of a fragment of the lug looking at the forward end thereof.

In the drawings the rim of the wheel is indicated at 1 and the tire at 2, the tire being of large cross section (an 11.25 tire being shown). Tires of this size run at comparatively low pressures, from about 12 to 20 pounds, a circumstance which has been adapted effectively to the problems and conditions involved in the design of the present lug.

The lugs, or shoes, are indicated in general at 4, a set being shown mounted upon a wheel in Fig. 1. Each of these lugs is attached by chains 5 to the circumferential chains 6, the showing in Fig. 1 being diagrammatical. The lug consists of a large steel plate which is arched, both transversely and longitudinally, to conform in a general way to the curvature of the tire. In the center of the lug is formed the relatively large opening 6, the metal around the edge of the opening being preferably bent outwardly slightly, as at 7, to obviate sharp edges at this point, which would tend to cut the tire. The purpose of forming a large opening in the plate or base of the lug is to permit the tire, under load, to enter the opening sufficiently to perform a new and very useful function. The tire, under load, is depressed into the opening as it contacts with the ground, and as the tire rolls around and the pressure is relieved, the tire tread will work in and out of the opening, creating alternate pressure and suction at the plate. This operation is secured by the fact that the tire is large and operates at low pressures, and the action loosens any cakes of mud that may adhere to the lug, so that they drop off rather than being carried around on the lug. This self-cleansing feature is a very important attribute of the improved lug, and as the cakes of mud are shed automatically as the lugs leave the ground a clean lug is always presented to the surface.

The sides of the plate are formed with centrally located swells or elevations 8, which are formed by stamping the metal outwardly, these swells affording points for attachment of the radial chains 5. The purpose of forming the swells 8 is to permit the use of the ordinary link chains for attachment. In other forms of lug it has been necessary to use welded rings for the attachment of the radial chains, but this not only increased the expense of making the lugs, but also made it difficult to replace broken chains in the field. By the use of an ordinary chain of the link type, attachment and replacement is made easy. With the projecting formations 8, it is also possible to attach the chains directly to the plates, and the chains will be removed from the tire tread so that injury of the tire is prevented.

It will be noted that each lug is attached to the circumferential chain by a single radial chain attachment at a side. Hitherto it was the practise to use two chains on a side attached to each corner. By the single, centrally located chain suspension a greater freedom of movement and a limited rocking action is allowed to the lug, and it may rock on its points of suspension. This is a particularly valuable feature in devices intended for very heavy work for, when the wheel is rotating, the strain upon the circumferential chain tends to draw the radial chains out of radial position, and the tendency of the chains is to cock or tilt the lugs, causing them to dig into the tire sufficiently to prevent travel of the tire through the lugs. As the tire is operated at low pressures, the plate will embed itself easily into the tread surface.

The major tractive effect of the lug is derived from the deep forward flange 10 which is formed by bending the metal of the lug outwardly radially of the wheel. This lug is formed in a V, or chevron formation, the purpose of which is to provide the maximum tractive effect due to the increased length of flange permitted by the diagonal arrangement, and this result is secured without presenting abrupt walls to the ground as the wheel rotates in the direction of the arrow in Fig. 1. Where the flanges in former constructions were usually formed directly across the lug, the presentation of an abrupt wall interfered with the rolling of the wheel, whereas with the chevron or V-shaped, the contact is gradual. The abruptness of the flange is further relieved by reducing the depth of the flange at the apex and leading up to the lowest point 12 by the tapered or inclined portions 13. The nose or apex of the flange is curved, as shown, which contributes to this result. The formation of the flange in the manner shown also contributes to the possibility of running tires equipped with these lugs over paved surfaces without injuring the pavement.

It will be observed that the flanges extend outwardly beyond the sides of the plate to form widely spread wings 15 on either side of the plate. This not only increases the tractive effect while bearing the load, but also has the important function, secured by the extensive projection of the flanges beyond the sides of the tire, in that the flanges will bite into the walls of any ruts, into which the tires may drop, and thus retain the tractive effect even though the wheels are deeply embedded in ruts. Not only is the vehicle propelled by the tractive effect of the lug immediately supporting the load, but also by the engagement of the lugs in the side walls of a rut on either side of the lowermost point on the wheel. The effectiveness of the wings adds materially to the utility of the new lug.

These relatively sharp flanges extending over a great area will cut through any shucks or other material strewn upon the ground, which normally constitutes a slippery mat-like surface.

It will also be observed that the flange 10 is located at the very forward end of the lug. Were the flange set backwardly from the forward edge of the plate, the angular recess would form a pocket and permit the adherence of cakes of mud at this point, but by the construction and design shown, this action is prevented, as no pocket is formed forwardly of the plate. As the tire is relatively soft, it will bulge outwardly under load, in front of the plate, and the repeated deflection of the tire at this point will set up a wiping action across the front of the flange and loosen any adhering mud. Prevention of caking rearwardly of the flange is by the provision of the opening 6, which is located between the two sides of the flange and thus removes any cake formed at this point.

A minor flange 18 may be formed on the rear of the lug body, if desired, and this will also assist in the tractive effect.

Many of the features shown and described may be embodied in other and specifically different forms and constructions of lugs, all within the scope of the invention as set forth in the appended claims.

What is claimed is:

1. A traction lug for tires, comprising a plate, and an upstanding flange formed upon said plate, said flange being substantially V-shaped, the apex of which is reduced in depth to relieve the impact on the ground.

2. A traction lug for tires, comprising a plate, and an upstanding flange formed upon said plate, said flange being substantially V-shaped, the apex of which is rounded and reduced in depth to relieve the impact on the ground.

3. A traction lug for tires, comprising a plate, and an upstanding flange formed upon said plate, said flange being substantially V-shaped, the apex of which is rounded and reduced in depth to relieve the impact on the ground, the extremities of the flanges being extended laterally beyond the plate to form projecting wings.

FREDERICK A. OLMSTEAD.